United States Patent [19]

McMahon

[11] Patent Number: 5,209,322
[45] Date of Patent: May 11, 1993

[54] ELEVATED WHEELCHAIR DEVICE

[76] Inventor: Robert McMahon, P.O. Box 10214, Reno, Nev. 89510

[21] Appl. No.: 678,794

[22] Filed: Apr. 1, 1991

[51] Int. Cl.$^5$ ............................................. B60K 28/00
[52] U.S. Cl. .................................... 180/271; 180/907; 280/304.1
[58] Field of Search ........................... 180/271, 907; 280/304.1

[56] References Cited

U.S. PATENT DOCUMENTS

| | | | |
|---|---|---|---|
| 3,905,436 | 9/1975 | Karchak et al. | 180/907 |
| 4,375,840 | 3/1983 | Campbell | 180/907 |
| 4,613,151 | 9/1986 | Kielczewski | 180/907 |
| 4,614,246 | 9/1986 | Masse et al. | 180/907 |
| 4,934,723 | 6/1990 | Dysarz | 280/304.1 |
| 4,993,736 | 2/1991 | Garman et al. | 280/304.1 |
| 5,011,175 | 4/1991 | Nicholson et al. | 280/304.1 |
| 5,112,076 | 5/1992 | Wilson | 280/304.1 |

FOREIGN PATENT DOCUMENTS

| | | | |
|---|---|---|---|
| 338689 | 10/1989 | European Pat. Off. | 180/907 |
| 2703727 | 8/1978 | Fed. Rep. of Germany | 180/907 |

*Primary Examiner*—Joseph E. Valenza
*Attorney, Agent, or Firm*—Brian C. Kelly

[57] ABSTRACT

A wheelchair device which has an elevator seat which can raise the operator seated in the wheelchair in order to have access to normal counters and shelving and also can lower the operator to have access to the floor. The chair can be manual or electric both in its locomotion and elevation. The device further includes a locomotion safety governor for restricted speed operation in both the elevated and lowered configurations and a tilt sensing device to require a return to normal height in order to resume operation.

9 Claims, 3 Drawing Sheets

ELEVATED WHEELCHAIR DEVICE

FIELD OF THE INVENTION

The present invention relates in general to a novel wheelchair mechanism.

BACKGROUND OF THE INVENTION

There have been numerous advancements in the wheelchair art in lightening the frames thereof and improving the balance characteristics and new electric locomotion systems. Even with these advances, the present art has not overcome one of the major difficulties facing a handicapped person who is confined to a wheelchair which is the fact that a seated person is simply not as tall as a standing person. This presents itself in something as simple as cooking in a kitchen with counters of standard height or reaching for articles in overhead cabinets. The problem is more accute in banks and stores; a person in a wheelchair is nearly eye level with the counter as compared to those standing, which makes carrying on business transactions more difficult and uncomfortable for the handicapped person. Also, as pointed out in U.S. Pat. No. 4,613,151 to Kielzcewski, there are significant advantages to lowering the ride height of a wheelchair such as being able to pick something up off the floor, playing with small children, picnicking, traversing rough terrain with an advantageously lower center of gravity, or to work in a garden. All of those activities require lowering the height of the chair. U.S. Pat. No. 4,934,723 to Dysarz discloses a wheelchair on stilts. However, for the Dysarz invention to be operated, an occupant would have to raise the chair and then if the occupant wanted to move down a counter or move in any direction, the occupant would have to lower the chair, make the move, and then re-elevate the chair. The Kielzcewski reference only refers to lowering the chair below a standard height. Applicant has overcome these difficulties by introducing a novel wheelchair that both lowers and raises the ride height, which is not in the prior art. Further, it allows restricted mobility in each of these configurations.

Applicant has overcome these difficulties by introducing an elevator wheelchair.

SUMMARY OF THE INVENTION

A first object of the invention is to provide a wheelchair whose seat is capable of being elevated upward so that occupants can more easily interact with the world around them.

A second object of the invention is to provide a wheelchair that is capable of lowering the seat so that the occupant can access low shelves and objects on ground level.

A third object of the invention is to provide a wheelchair whose seat can be raised or lowered manually or by a power driven system.

A fourth object of the invention is to provide a wheelchair which has a safety mechanism for restricted movement of the wheels of the chair when the seat is in any raised position.

A fifth object of the invention is to provide a wheelchair which has a safety mechanism for restricted movement of the wheels of the chair when the seat is in any lowered position.

A sixth object of the invention is to provide a safety mechanism to stop locomotion of the wheelchair if a designated tilt angle is exceeded until the designated normal operational height is re-established.

The invention includes a novel wheelchair device having a seat and a back support attached thereto, a wheel frame having 3 or more wheels and a means for attaching the frame and the seat back combination that will allow adjustment in the height of the seat with respect to the wheels.

BRIEF DESCRIPTION OF THE DRAWINGS

1. A side view of the adjustable wheelchair with the seat at a maximum, normal and lowered height (designated A, B and C, respectively).
2. A back view of the chair showing the guide nears and elevator means.
3. A detail side view of the vertical support channel.
4. A detail top view of the vertical support channel.
5. A front view of the wheelchair in the three heights.

DESCRIPTION OF THE PREFERRED EMBODIMENTS

Figure 1:
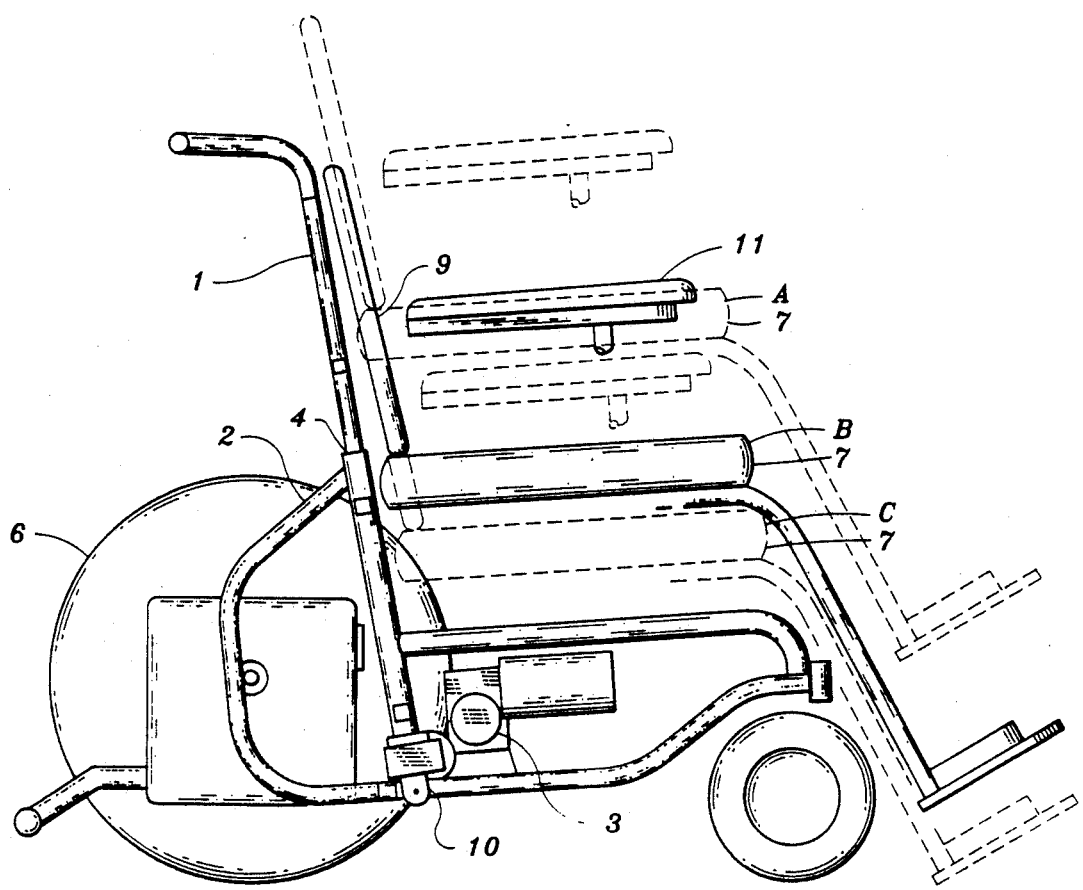
Figures 3, 4:
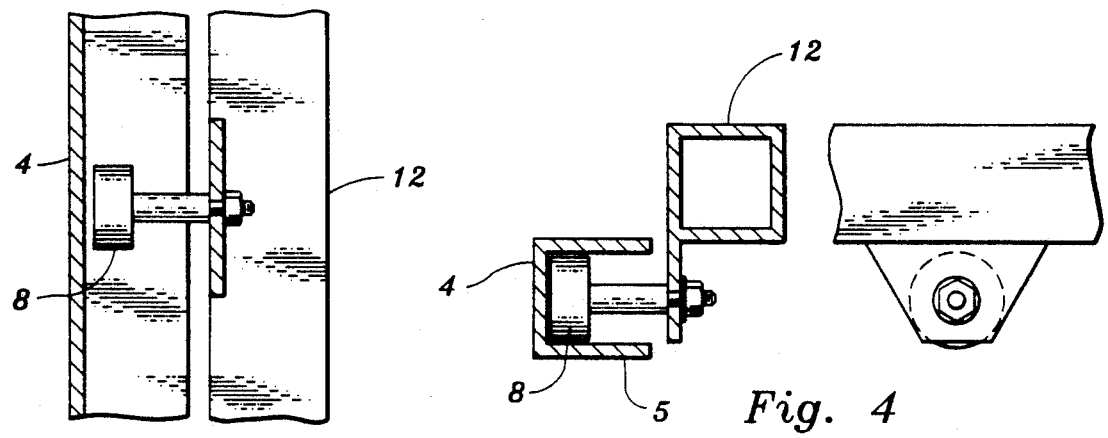
Figure 5:
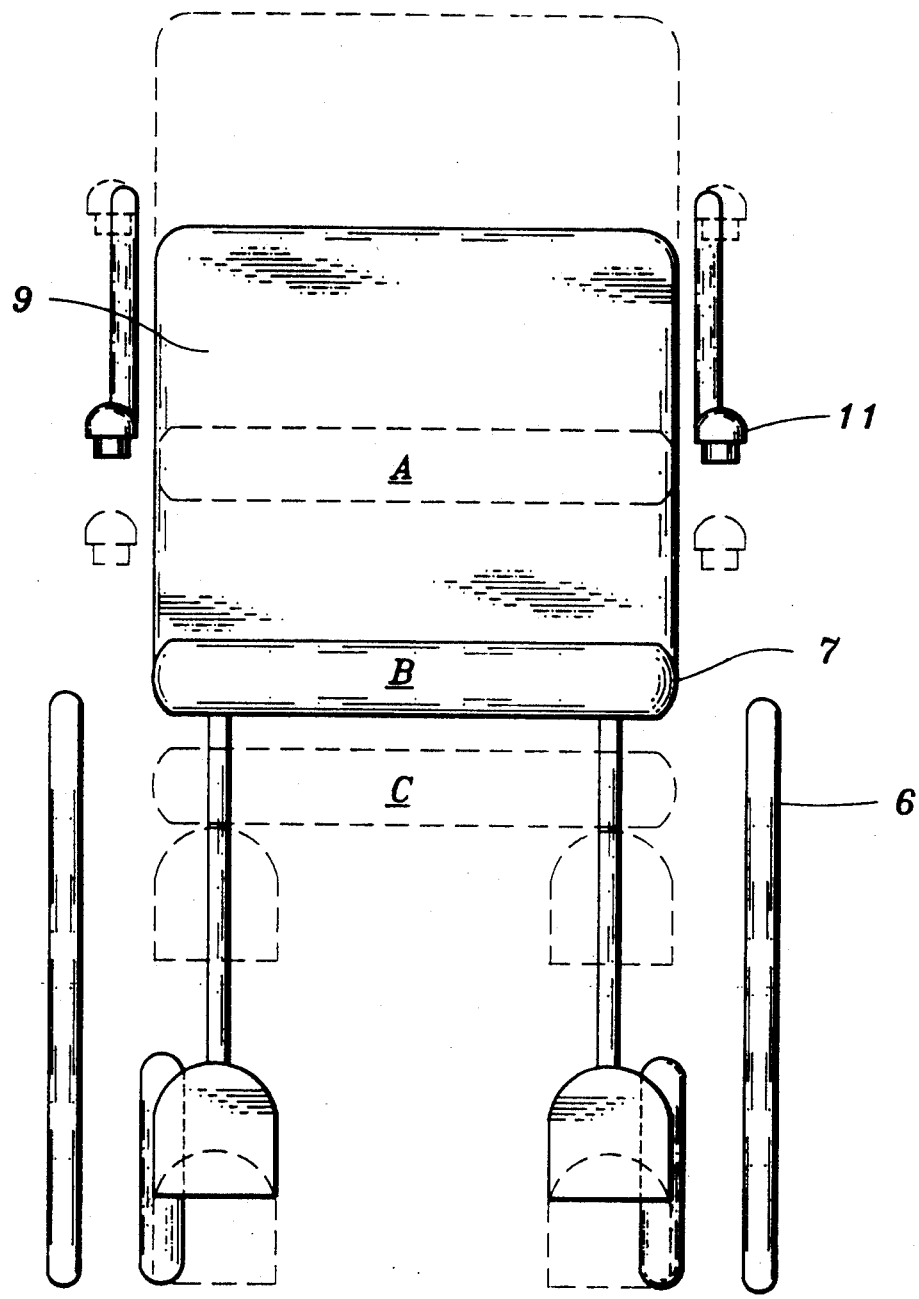

Applicant has developed the novel wheelchair shown in FIG. 1, having wheels 6 and a frame 2 including a standard electric drive locomotion system 3. The vertical supports 4 each have a channel 5 as shown in FIGS. 3 and 4 centrally disposed along the elongated axis of the vertical support 4 and positioned facing each other. These channels accept cam followers or guide wheels that are attached to the seat 7 and reduce the friction in the vertical travel of the seat 7 which are disposed in the channel to reduce minor lateral movements between the guide members.

The chair 1 in FIG. 1 is shown at its maximum height configuration A, normal height configuration B and a lowered height configuration C where the seat 7 referring to the distance between the seat 7 and the wheels 6. The height of the chair can be adjusted to any intermediate height between this maximum and a lowered position. The normal range can be established by a sensor and can be of variable span. This range is adaptable so that different heights can be established for different users.

The channel 5 accepts and retains a wheel or cam follower 8 to provide support and attach the seat 7 and chair back 9 and their integral frame to the wheel frame 2.

FIG. 1 also shows the elevator mechanism 10 in a preferred embodiment having an electric motor on a screw drive system sometimes referred to as a linear actuator or a screw jack. The elevator mechanism is mounted centrally on the wheel frame 2 and across member of the seat frame 12 shown also in FIG. 2.

Figure 2:
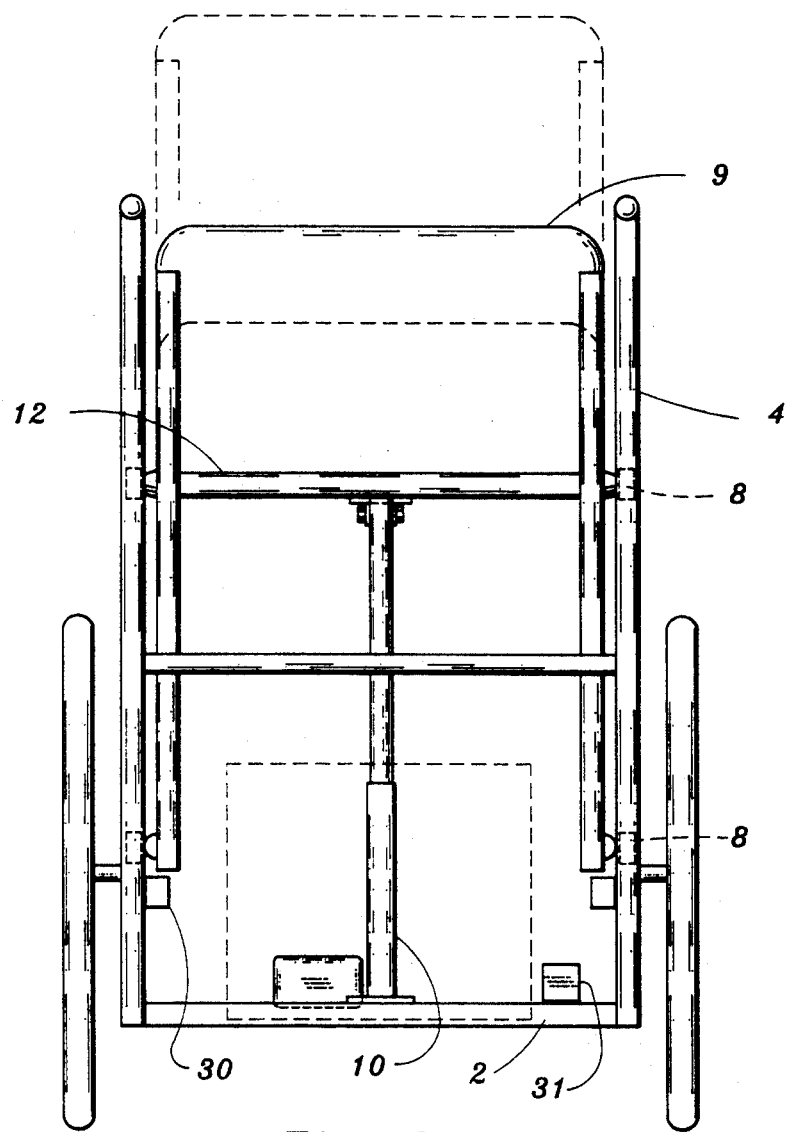

FIG. 2 shows a view from the back cutting through the known battery and known electric locomotion system to show the orientation of the elevator mechanism as attached to the wheel frame 2 and the seat frame 12.

In another embodiment, this elevation system comprises a rack and pinion and contemplates both a hydraulic and pneumatic system. The installation of either would require at least a pump and perhaps a reservoir.

In another embodiment not shown, the applicant intends to use a pumping movement of the arm rests 11 to activate the elevation system without the operation of electric motors.

It is also contemplated that a central linear actuator be replaced by dual actuators in the vertical supports 4, however, applicant experienced out of balance problems between the actuators at their present state of art.

However, as actuators improve, this design is also contemplated by the invention.

In the preferred embodiment, the height adjustment system is operated by a switch. Some safety features are built into the control system. Whenever the chair is either above or below a designated normal range of seat height as sensed by a sensor system, the locomotion system is allowed to operate only on a restricted movement basis. In other words the normal speed of the chair is restricted to a lower speed. However, normal maneuverability is maintained and the chair can be operated in a non-normal height. Also, a known tilt sensing mechanism is included so that if the chair is out of balance and the height is not in its normal position, the chair must be brought back to the normal position before it can be operated with any maneuverability. The purpose of this is to prevent a tip over in case an operator gets himself into such a position with the chair height above normal.

FIG. 2 also shows the safety mechanisms. The tilt sensing device 31 is attached to the frame 2. This sensor could be located anywhere on the frame and is shown merely for illustration. The normal position sensor 30 is attached to a guide 5. This sensor could be located in a number of positions and is merely shown for illustration. The normal position sensor indicates when the seat is above or below the normal position in order to engage a governor in the motor to reduce the speed of travel. A further safety feature is that when an unsafe tilt angle is sensed, the motor governor won't allow movement until the seat is returned to the normal position range.

Obviously, many modifications and variations of the present invention are possible in lieu of the above teachings. It is therefore to be understood that within the scope of the appended claims, the invention may be practiced otherwise than as specifically described.

What is claimed and desired to be secured by letters patent of the United States is:

1. A wheel-chair device comprising a seat, a back support fixedly attached thereto, a wheel frame comprising at least 3 wheels, and a means for attaching said seat and back support to said wheel frame being adjustable in establishing the height of said seat with reference to said wheels; wherein said means for attaching said seat and back support comprises an elevator means and a first guide member and a second guide such that they are aligned substantially parallel, and a follower of first member moves within said second member in a track therein wherein said track comprises three sides wherein said means for attaching said seat and back support comprises a support guide means and an elevator means wherein said elevator means comprises a screw drive further comprising an electric motor and control means for driving said screw both upward and downward from a normal position range wherein a governor means operates to restrict the speed of motion of said wheels when said seat is at a position other than said normal position range.

2. A wheel-chair device comprising a seat, a back support fixedly attached thereto, a wheel frame comprising at least 3 wheels, and a means for attaching said seat and back support to said wheel frame being adjustable in establishing the height of said seat with reference to said wheels; wherein said means for attaching said seat and back support comprises an elevator means and a first guide member and a second guide such that they are aligned substantially parallel, and a follower of first member moves within said second member in a track therein wherein said track comprises three sides further comprising a wheelchair safety system comprising sensor means to determine if a wheelchair seat within a specified normal range, and if said sensor means shows negative, a governor means restricts the operation of a locomotive means to a reduced speed.

3. A device as described in claim 2 further comprising a tilt sensing means which will require a return to a normal position range in order to re-establish locomotion if an unsafe tilt angle is sensed.

4. A device as described in claim 1 further comprising a sensor means for sensing whether said seat is within a normal position range.

5. A device as described in claim 4 further comprising a tilt sensing means which will require a return to a normal position range for said seat in order to re-establish locomotion if an unsafe title angle is sensed.

6. A wheel-chair device comprising a seat, a back support fixedly attached thereto, a wheel frame comprising at least 3 wheels, and a means for attaching said seat and back support to said wheel frame being adjustable in establishing the height of said seat with reference to said wheels, a governor means operates to restrict the speed of motion of said wheels when said seat is at a position other than said normal position range.

7. A device as described in claim 6 further comprising a sensor means for sensing whether said seat is within a normal position range.

8. A device as described in claim 7 further comprising a tilt sensing means which will require a return to a normal position range for said seat in order to re-establish locomotion if an unsafe tilt angle is sensed.

9. A device as described in claim 6 further comprising a wheel chair safety system comprising sensor means to determine if a wheelchair seat within a specified normal range, and if said sensor means shows negative, a governor means restricts the operation of a locomotive means to a reduced speed.

* * * * *